United States Patent

Yamada et al.

[15] 3,706,023

[45] Dec. 12, 1972

[54] HIGH VOLTAGE REGULATION CIRCUIT FOR TELEVISION RECEIVER

[72] Inventors: Hisashi Yamada, Yokohama; Hisao Tajiri, Kanagawa; Mitsugu Nishizawa, Yokohama, all of Japan

[73] Assignee: Tokyo Shibaura Electric Co., Ltd., Kawasaki-shi, Japan

[22] Filed: Oct. 1, 1970

[21] Appl. No.: 77,190

[30] Foreign Application Priority Data

Oct. 3, 1969 Japan ......................44/78876
Jan. 26, 1970 Japan ........................45/6542
Jan. 22, 1970 Japan ........................45/6141

[52] U.S. Cl. ....................321/2, 315/1, 315/169 TV, 315/209 CD

[51] Int. Cl. ..............................................H02m 3/22

[58] Field of Search..........178/DIG. 11; 321/2, 2 HF; 315/1, 3, 169 TV, 209 CD; 323/17

[56] References Cited

UNITED STATES PATENTS 2,667,614 1/1954 Covill ............................321/2
2,748,336 5/1956 Valeton et al. ..........321/2 HF

*Primary Examiner*— William M.Shoop, Jr.
*Attorney*—Flynn & Frishauf

[57] ABSTRACT

A high voltage regulation circuit in a high voltage power supply circuit for a television receiver in which a transistorized horizontal deflection circuit is connected to the primary winding of a flyback transformer is disclosed, said regulation circuit comprising a diode and a capacitor connected to the primary winding, and means for controlling the amount of discharge from said capacitor depending upon the current load change in the high voltage power supply circuit mainly during a tract period, whereby the variation of high voltage due to the load variation in the high voltage power supply circuit is prevented and stabilized high voltage is produced.

4 Claims, 9 Drawing Figures

HIGH VOLTAGE REGULATION CIRCUIT FOR TELEVISION RECEIVER

BACKGROUND OF THE INVENTION

This invention relates to a high voltage power supply for a television receiver, and more particularly to a transistorized high voltage regulation circuit for maintaining a high voltage at a predetermined fixed value irrespective of load variation in the high voltage power supply circuit.

In general, the output high voltage of a high voltage power supply circuit for feeding the voltage to a cathode ray tube (CRT) of a television receiver varies depending upon the load current change in the high voltage power supply circuit resulting from a scanning beam current change of the CRT. As a result, the width of a picture image varies and presents a poor appearance. Particularly in a color television receiver, the variation of high voltage will adversely affect beam convergence, resulting in incorrect color.

As is well known, a circuit for producing such high voltage up to 20 KV includes a flyback transformer, a horizontal deflection circuit for providing flyback pulses to the primary winding of the transformer and a circuit for step-up rectifying the flyback pulses, the rectified high voltage being supplied to the anode of a cathode ray tube, for example. In a vacuum tube television receiver, a so-called shunt regulator tube is connected in parallel with a D.C. high voltage circuit and upon the change of output voltage of the high voltage circuit due to the change of a beam current (i.e. brightness) of the cathode ray tube the current flowing through the shunt regulator tube is regulated by controlling the grid voltage of the tube to maintain the load current flowing through the high voltage circuit at a predetermined fixed value. However, a breakdown voltage between a plate and a cathode of the shunt regulator tube must withstand said high D.C. voltage and high power dissipation is required. In addition, hazardous X-ray may be emitted from the plate and also there is a problem in its reliability.

On the other hand, where the receiver is constructed from solid state devices, it is desirable to construct with semiconductor devices (transistors) not only said horizontal deflection circuit but also the high voltage regulator circuit for controlling the voltage of said high voltage circuit at a fixed value. However, since the breakdown voltage of semiconductor devices is relatively low it is impossible from a standpoint of the breakdown voltage to abolish the prior art vacuum tube circuit and substitute therefor an equivalent transistorized circuit. In the control of the vacuum type shunt regulator tube, so-called boost voltage can be used, but in constructing the solid-state high voltage regulator circuit it is difficult to use the boost voltage as a control signal for the semiconductor device. Thus when the high voltage regulator circuit is to be constructed with semiconductor devices, a circuit arrangement different from a prior art one is required and the use of cheaper elements is particularly desirable. As a transistorized high voltage regulator circuit which merely meets the above requirement, the following circuit arrangement which controls the output voltage only by power dissipation is proposed tentatively. Namely, a third winding is coupled to the flyback transformer, the third winding having a series circuit of a diode and a capacitor connected therewith. A power dissipation controlling series circuit including a transistor and resistor is connected in parallel with the said capacitor. The amount of power dissipation of the series power dissipation circuit is varied depending upon the variation of the high voltage load current or beam current to regulate the high voltage at a fixed value. In the circuit arrangement of this type, since that amount of power which corresponds to the increment of the variation in the high voltage load current is dissipated in the series circuit comprising the resistor and the transistor, a considerable amount of power dissipation is generated. For this reason, expensive elements capable of dissipating high power are required for the transistor and the resistor. Also the design of circuit parameters is difficult. In addition, in order to sample the variation in the high voltage load current resistor withstandable to high voltage must be connected to the high voltage winding of the flyback transformer. Furthermore, for passing high voltage variation produced across the resistor to the power dissipation transistor as a control signal therefor, the variation must be amplified through several transistor amplifier stages. This also results in the increase of cost and hence the above circuit arrangement is not practical although it meets the requirements of the high voltage regulator circuit as described above. Alternately, in regulating high voltage with a transistorized regulator circuit it has been known to connect a saturable reactor in the regulator circuit and to control the inductance of the reactor to change the resonance condition of the deflector circuit for regulating the high voltage. However, because of the facts that the design of the reactor transformer is difficult and that the production of the reactor transformers of uniform characteristic is difficult, the arrangement is relatively expensive, and it does not meet the above-mentioned requirements.

SUMMARY OF THE INVENTION

The inventors of the present invention have found that in a high voltage power supply circuit in which a solid-state horizontal deflection circuit for supplying flyback pulses is connected to the primary winding of the flyback transformer, a high voltage regulator circuit could be simplified by varying the capacitance of a retrace resonance capacitor in the horizontal deflection circuit to vary the flyback pulse width, i.e. the retrace period, and thus the voltage variation of the high voltage power supply could be prevented without requiring high voltage, high current semiconductor devices.

It is, therefore, an object of this invention to provide a high voltage regulator circuit for preventing the voltage variation of the high voltage power supply circuit wherein the capacitance of the capacitor connected in the solid-state horizontal deflection circuit connected to the primary winding of the flyback transformer is changed according to the variation of the high voltage circuit load current.

In accordance with the present invention, the high voltage regulator circuit for a television receiver high voltage power supply circuit comprising a flyback transformer, a solid-state horizontal deflection circuit connected to the primary winding of the flyback transformer for supplying flyback pulses to the primary winding and a step-up rectifying circuit for the flyback pulses, includes a first diode directly connected to the primary winding for rectifying the flyback pulses, a first capacitor connected in substantially parallel with the deflector circuit for being charged by the rectified voltage, a transistor connected in parallel with the first capacitor and a control circuit for the transistor for detecting the current flowing through the primary winding during the horizontal trace periods and controlling the conductivity or internal resistance of the transistor in response to the detected current to control the amount of discharge from the first capacitor.

By thus controlling the amount of discharge, the capacitance of the high voltage regulator circuit can be varied correspondingly and hence the capacitance of the horizontal deflection circuit can be varied correspondingly to vary the flyback pulse width. With the change of the flyback pulse width the flyback pulse voltage varies. Accordingly, the flyback pulse voltage may be changed in accordance with the current flow through the primary winding of the flyback transformer and hence the voltage variation due to the load change of the high voltage power supply circuit, i.e. the change in the CRT beam current can be stabilized.

DETAILED DESCRIPTION OF THE INVENTION

The details of the present invention will be apparent from the following description with reference to the accompanying drawings, in which.

Figure 1:
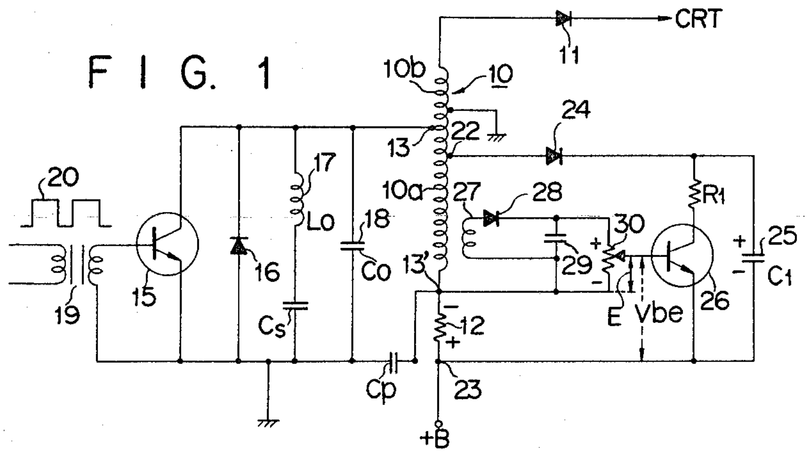
FIG. 1 is a circuit diagram of a preferred embodiment of the present invention.

Before discussing the preferred embodiments, the relationship between the flyback pulse width D and the flyback voltage P is first explained. In the instant specification, by the flyback pulse width D is meant a retrace period. Assuming that the D.C. voltage supplied to the primary winding of the flyback transformer is +B volts, the horizontal deflection period is $T_H$ (63.5 $\mu$sec) and the retrace period, i.e. the flyback pulse width is D, D being usually in the order of 10$\mu$sec, then the flyback pulse voltage P can be expressed by the formula (1):

$$P=B\cdot\frac{T_H-D}{D} \qquad (1)$$

Assuming that the inductance of the deflection coil is Lo and the capacitance of the retrace resonance capacitor in parallel with the inductor *Lo* is *Co*, the flyback pulse width D in the formula (1) can be given as:

$$D=\pi\sqrt{LoCo} \qquad (2)$$

It is apparent from the equations (1) and (2) that the flyback pulse voltage P can be varied by varying either the inductance Lo in the retrace resonance circuit of the horizontal deflection circuit or the capacitance *Co* of the resonance capacitor. That is, by connecting a capacitor in parallel with the capacitor *Co* in the primary winding of the flyback transformer and varying the equivalent capacitance of the former capacitor in connection with the high voltage load current of the flyback transformer, i.e. the electron beam current, the capacitance *Co* can be varied in accordance with the load current. Namely, from the equation (2) the flyback pulse width D will change and from the equation (1) the flyback pulse voltage P can be varied in accordance with the high voltage load current. As the flyback pulse voltage P varies, the high voltage produced at the output of the step-up rectifier circuit, of course, varies. In this case the arrangement should be so controlled that depending upon the increase or decrease of the load the voltage P increases or decreases with respect to a reference voltage. The control means for this purpose is illustrated in FIG. 1.

In FIG. 1, the flyback transformer 10 includes a primary winding 10*a* and a secondary winding 10*b* for stepping up the primary winding voltage, a free end of the secondary winding is coupled through a high voltage rectifying diode 11 to an anode of a cathode ray tube (CRT). A free end of the primary winding 10*a* is coupled through a current detection resistor 12 to a positive terminal of a D.C. voltage supply +B. Connected between the terminals 13 and 13' of the primary winding 10*a* is a horizontal deflection circuit comprising a horizontal deflection output transistor 15, a dumper diode 16 polarized as shown in the figure and connected in shunt between the emitter and the collector of the transistor 15, a series connection of a deflection coil 17 and an S correction capacitor *Cs*, and a retrace resonance capacitor 18 (of fixed capacitance *Co*). A capacitor *Cp* is connected for preventing hunting as described below. Horizontal synchronous pulses 20 are applied between the base and the emitter of the transistor 15 through a pulse transformer 19.

Connected between a tap 22 of the primary winding 10*a* and a terminal 23 of a resistor 12 is a series connection of a first diode 24 polarized as shown and a first capacitor 25 (capacitance $C_1$). Connected in parallel with the capacitor 25 is a series connection of capacitance control transistor 26 polarized as shown and an external resistor $R_1$. Connected between the base and emitter of the transistor 26 as a constant bias voltage source E is a circuit as described below connected to the flyback transformer 10. Namely, there is provided a third winding 27 for taking out flyback pulse voltage from the primary winding 10*a*. Voltage induced across the third winding serves to charge a capacitor 29 through a diode 28, and a constant D.C. bias voltage of the polarity as shown in the figure is produced across a potentiometer 30 connected in parallel with the capacitor 29. The constant D.C. bias voltage may be of a predetermined value less than 10 volts. When such voltage is produced across the potentiometer 30 a suitably divided voltage E is produced at a variable tap. The voltage E is sufficient to conduct the transistor 26 and serves as a reference bias. In the example illustrated in FIG. 1 the D.C. voltage E is produced by rectifying flyback pulses sampled from the primary winding of the transformer 10. Although the amplitude of the flyback pulse may vary, a substantially constant D.C. voltage may be produced across the potentiometer 30 by suitably selecting a time constant of the capacitor 29 and the potentiometer 30. A battery may be used as the D.C. bias voltage E as described below or other D.C. voltage supply may be used. What is necessary is to supply a reference bias voltage sufficient to conduct the transistor 26 by such D.C. bias voltage.

The terminal 13' is connected with a negative terminal of the potentiometer 30 and the terminal 23 is connected with the emitter of the transistor 26. The variable tap of the potentiometer 30 is connected to the base of the transistor 26, and the difference between the voltage drop across the resistor 12 and a fraction of the voltage drop across the potentiometer 30 is supplied to the base of the transistor 26 as a control signal.

Figures 2, 3:
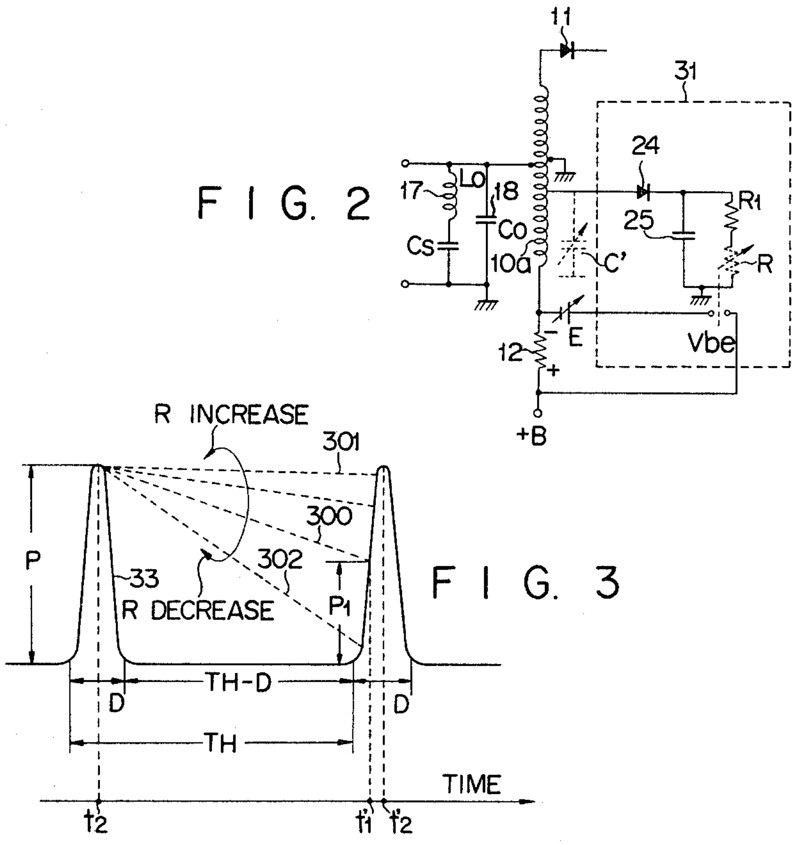
FIG. 2 is an equivalent circuit diagram illustrating the relationship between an equivalent capacitance of the regulator circuit shown in FIG. 1 and a fixed capacitance of the horizontal deflection circuit.
FIG. 3 shows a waveform illustrating the change in the equivalent capacitance in FIG. 2.

Charge and discharge circuit elements of the regulator circuit of FIG. 1 are designated together by a circuit 31 enclosed by a dotted line (FIG. 2), and equivalent capacitance of this circuit is designated by the capacitance C' as shown by a dotted line. By the addition of a resonance circuit of the deflection circuit an equivalent circuit for FIG. 1 is as shown in FIG. 2. The transistor 26 in FIG. 1 may be expressed by an internal resistance R corresponding to the degree of conduction of the transistor. Since the internal resistance R varies with the base-emitter bias voltage Vbe, it is expressed in the equivalent circuit of FIG. 2 by a variable resistor R. Furthermore the variable resistor R is shown in FIG. 2 as having a virtual slider (shown by a dotted line) so that the slider may be moved in response to the base-emitter voltage Vbe. As shown in FIG. 2, the voltage Vbe is the difference voltage between the constant D.C. bias voltage E and the voltage drop across the resistor 12. The D.C. voltage E may be set at an appropriate value.

Referring now to FIGS. 1 and 2 the operation of the embodiment is described. Each time the horizontal pulse 20 shown in FIG. 1 is applied, the transistor 15 is rendered conductive by its positive pulse portion, the current flowing through the deflection coil 17 being linearly increased during the conduction of the transistor 15. When the transistor 15 is cut off by the negative portion of the horizontal pulse 20 a resonance circuit comprising the inductance Lo of the deflection coil 17 and the capacitance Co of the retrace resonance capacitor 18 is resonated. By ceasing the resonant oscillation at a half cycle by a damper diode 16, saw-tooth deflection current flows through the deflection coil 17, as is known in the art. During the fall period of the saw-tooth current, i.e. the retrace period, flyback voltage is produced across the deflection coil, which flyback voltage is supplied to the primary winding of the flyback transformer and then stepped up by the secondary winding to be rectified to produce D.C. high voltage, as is also well-known in the art.

The flyback pulse is also sampled from the primary winding 10*a* to conduct the first diode 24 forwardly only during the retrace period to charge the capacitor 25 with the illustrated polarity. The charge of the capacitor 25 is discharged mainly during the horizontal trace period through the transistor 26. The amount of discharge, however, is limited by the degree of conduction of the transistor 26, i.e. the value of the internal resistor R. In other words, since the voltage difference Vbe between the voltage drop of the illustrated polarity across the current detecting resistor 12 and the voltage drop E of the illustrated polarity across the potentiometer 30 is applied between the base and the emitter of the transistor 26, the greater the load current the lesser is the amount of discharge and vice versa. The internal resistance R of the transistor 26 varies with the voltage V*be*, and the charge of the capacitor 25 is discharged in accordance with the control voltage V*be* during the trace period. Although the D.C. bias voltage E is constant, since the voltage drop across the current detecting resistor 12 varies with the input current flowing through the primary winding 10*a* of the flyback transformer, Vbe is varied. Since the current flowing through the primary winding 10*a* varies with the beam current flowing through the secondary winding 10*b*, V*be* varies with the CRT beam current. The voltage drop across the resistor 12 is filtered by the capacitor C*p* so that it does not respond to the beam current variation in a short period such as one field period but respond to mean beam current variation. It should be noted that when the beam current flowing through the secondary winding 10b varies within the range from 0 to 1.2 mA, several hundreds mA of variation occurs in the primary winding 10*a*. Thus, corresponding several hundreds mA of current change is produced in the current detecting resistor 12, and if the resistance value thereof is selected at several ohms the voltage drop across the resistor 12 may be taken out without amplifier. For this purpose, the current detecting resistor 12 may be connected in series with a B power supply path for the horizontal deflection output transistor 15. In response to the voltage drop across the resistor 12, the internal resistance R of the transistor 26 is controlled. The detecting resistor may be of several watts power dissipation and the detection sensitivity can be adjusted by varying the resistance value. Thus, when the beam current is high V*be* becomes low and hence the amount of discharge from the capacitor 25 is small whereas when the beam current is low the V*be* becomes high and the amount of discharge is large.

Now, the manner in which the equivalent capacitance C' shown in FIG. 2 during retrace period varies with the amount of discharge will be discussed. As seen from FIG. 3, flyback pulses 33 occur at a repetition rate of the period $T_H$ (horizontal deflection period). Voltage value of the flyback pulse is expressed by P. During the retrace period the capacitor 25 is charged to the pulse voltage P. During the trace period the charge due to the voltage P is discharged through the internal resistance R of the transistor 26 along the curve 300 in FIG. 3 until the next flyback pulse occurs, when the voltage across the capacitor 25 is $P_1$. D is the width of the flyback pulse as stated before. In the illustrated curve 300, the time period $t_2 - t'_1$ is considered to be a net discharge period, the time period $t'_1 - t'_2$ be a net charge period for the capacitor 25 during the next retrace period.

NOw, considering the equivalent capacitance C' (FIG. 2) for the capacitor 25 during the retrace period from the primary winding of the flyback transformer, C' may be considered as the change of charge $Q$ of the capacitor 25. Namely, since the charge $Q=C_1P$ of the capacitor 25 changes to $C_1$ $(P - P_1)$ through the discharge, the equivalent capacitance $C'$can be expressed by $$C'=C_1\frac{P-P_1}{P} \quad (3)$$

As shown in FIG. 3, $P_1$ can be varied widely by varying the time constant of the capacitor 25 and the resistance of discharge circuit (including the internal resistance of the transistor). In this case, since the resistor $R_1$ is a fixed one the time constant may be changed by changing the internal resistance R of the transistor 26. Namely, if the transistor 26 is cut off the internal resistance R approximates to infinity and $P_1$ becomes equal to P while if the transistor 26 is sufficiently conducted to present small internal resistance R, $P_1$ approximates to zero. In FIG. 3, $P_1$ changes between the discharge curves 301 and 302. Accordingly, the variation range of the equivalent capacitance C' may be adjusted within the range of 0 ~ $C_1$. Since the equivalent capacitance C' is connected in parallel with the retrace resonance capacitor C*o* (fixed capacitor) of the deflection circuit, the resultant capacitance equal to C*o* + C' varies during the retrace period. As the result capacitance charges the pulse width D changes which in turn causes the flyback voltage P to be changed in response to the current flowing through the flyback transformer. Thus, when the current flowing through the resistor 12 is low the amount of discharge from the capacitor 25 becomes large and the equivalent capacitance C' existing during the next retrace period becomes large. Accordingly the pulse width $D$ in the equation (1) increases and the flyback pulse voltage $P$ decreases so that the high voltage produced by rectifying the pulse voltage decreases and thus the high voltage regulation is effected. When the beam current in the high voltage circuit increases to increase the current flowing through the resistor 12, the voltage $P$ increases. It is thus apparent that a constant high voltage can be provided independently of the amount of the beam current.

Figure 4:
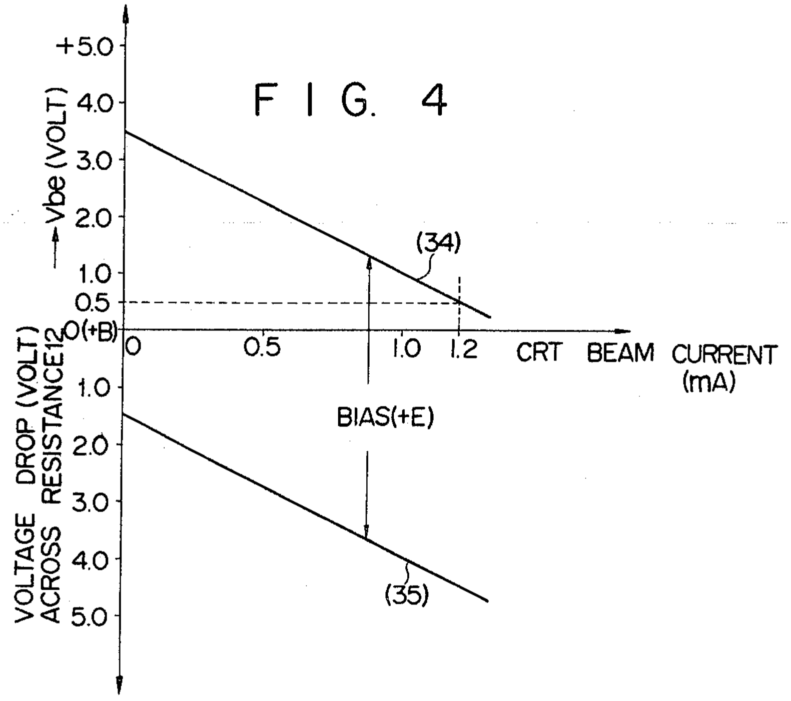
FIG. 4 is a chart showing the relationship between the beam current of the regulator circuit of FIG. 1 and the bias voltage of a control transistor.

The bias condition for the transistor 26 of FIG. 1 will now be described particularly with reference to FIG. 4. The X axis represents the CRT beam current and the Y axis represents in its positive sense the base-emitter voltage V*be* of the transistor 26 with respect to +B as reference voltage and in its negative sense the voltage drop across the current detecting resistor 12 with respect to +B as reference voltage. The origin 0 of the Y axis represents the reference voltage. As the beam current increases from 0 to 1.2 mA the current through the current detecting resistor 12 changes by about several hundreds mA. Thus the voltage drop thereacross is in the range of about 1.5~4.5 V. This change is shown in FIG. 4 by the characteristic curve 35. The fixed bias voltage E is set to about 5 V by setting the center tap of the potentiometer 30. The base-emitter voltage V*be* of the transistor 26 constitutes the difference between the voltage E and the voltage drop across the resistor 12, so that the change for the beam current may be represented by the characteristic curve 34 of FIG. 4. By adjusting the center tap of the potentiometer 30 the voltage E is changed. Thus, for example, the bias voltage E is selected such that the transistor 26 is cut off at the beam current of 1.2 mA, and the voltage V*be* is set to 0.5 V. As the beam current decreases from 1.2 mA, V*be* varies from 0.5 to 3.5 V and the conduction of the transistor 26, i.e. the internal resistance R also decreases. As a result, the amount of discharge increases as shown in FIG. 3 and the equivalent capacitance C' increases which, in turn, decreases the flyback pulse voltage $P$ as described before. Thus the high voltage is maintained substantially constant with respect to the beam current. In controlling the high voltage at a fixed value of 20 KV in spite of the beam current change of 0~1.2 mA, retrace period D was measured to change from 11 $\mu$ sec to 12 $\mu$ sec while the flyback pulse voltage P at the primary was measured to change from 800 to 700 V.

In the regulator circuit of FIG. 1 according to the present invention, the retrace resonance capacitance C' during the retrace period is controlled to regulate the high voltage. Since the capacitor 25 forming the capacitance C' is connected to the primary winding **10*a* of the flyback transformer 10 the circuit design is easier. It should be noted that since the capacitor 25 is connected to the primary winding 10*a***, the capacitance variation of the equivalent capacitance C' effectively serves as the retrace resonance capacitance of the retrace resonance circuit converted to the primary equivalence. In this way the high voltage regulation of the present invention is effected.

In the description hereinabove the storage time of the diode 24 was not considered in order to make the understanding easier. The inventors of the present invention, however, have found that in practising the present invention the longer storage time of the diode 24 is advantageous.

Figure 5:
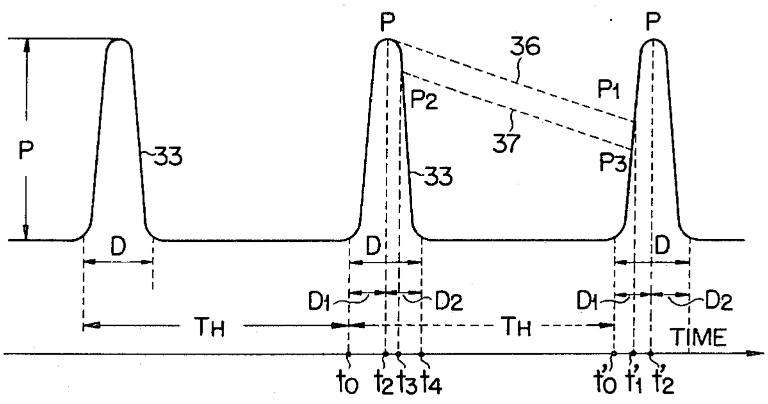
FIG. 5 shows a waveform used to illustrate a flyback pulse.

Referring to FIG. 5, the function of the equivalent capacitance C' is discussed in detail considering the storage time tsg of the diode 24.

In FIG. 5, the retrace period D during which the flyback pulse exists is divided into earlier half $D_1$ and later half $D_2$. The earlier half $D_1$ ranges from the initial time $t_0$ of the retrace period to the time $t_2$ at which the flyback pulse reaches its peak value. The later half $D_2$ ranges from the peak time $t_2$ to the end time $t_4$ of the retrace period, wherein $|t_0-t_2|=|t_2-t_4|$. In the previous description it was only noted that the capacitor 25 was charged during the retrace period D by the flyback pulse. Since the charging is effected during the earlier half $D_1$ of the retrace period, it may be said that the equivalent retrace resonance capacitance C' is effective only during the earlier half $D_1$ of the retrace period. The original retrace resonance capacitor (C*o*) 18 is charged during the earlier half $D_1$ of the retrace period and discharge current flows through the deflection coil Lo from the positively charged voltage P of the capacitor 18 during the later half $D_2$. Thus, the retrace resonance capacitor C*o* functions as the retrace resonance capacitor throughout the retrace period. On the other hand, during the later half $D_2$ of the retrace period, since the diode 24 is cut off the equivalent capacitance C′ will not be discharged during the later half $D_2$ even though the diode 24 is charged from the voltage $P_1$ to P, for example, and will be discharged during the next trace period. That is, the capacitance C′ serves as the retrace resonance capacitance only during the earlier half $D_1$. Although the capacitance C′ is effective only during the earlier half $D_1$ it has been proved that a satisfactory high voltage regulation operation is provided because the C′ is added to the retrace capacitance *Co* during the earlier half period $D_1$. The storage time *tsg* of the semiconductor diode is usually $0.1\mu$ sec for relatively high performance diode and $1\mu$ sec - $2\mu$ sec for relatively low performance diode. Thus, the diode 24 is not cut off at the moment of application of the cut off bias voltage to the transistor 26 but it conducts in the direction opposite to its normal conduction direction for the storage time tsg starting from said moment. As for the diode 24 of FIG. 1 or FIG. 2, at the moment of the application of the flyback pulse the diode 24 is ON and forwardly conducted during the earlier half $D_1$ of the retrace period $D_1$ and it is not cut off as soon as the later half period $D_2$ begins. Since the capacitor 25 has been charged to the flyback pulse voltage P during the earlier half period $D_1$, the voltage applied to the diode 24 reversely biases it during the later half periods and the diode tends to be cut off. However, as mentioned above, during the storage time tsg the charge of the capacitor 25 discharges through the diode 24 and flows into the deflection coil Lo. The discharge current from the capacitor 25 in this case causes the capacitor to further function as the equivalent retrace resonance capacitance C′ during the diode storage time tsg in the later half $D_2$ of the retrace period. Assuming that the storage time *tsg* is equal to $|t_3-t_2|$ the discharge status of the capacitor 25 is described in detail. During the earlier half $D_1$ of the retrace period, i.e. from the time $t_o$ to $t_2$, the capacitor 25 is charged to the voltage P. Since the period of $t_2-t_3$ of the later half period $D_2$ is the storage time *tsg*, the discharge current flows into the deflection coil Lo through the diode 24 during this period and the voltage across the capacitor 25 falls from P to $P_2$. After the time $t_3$, the discharge current flows during the remainder of the later half period $D_2$ ($t_3-t_4$) and the trace period $T_H$—D through the series connection of the resistor $R_1$ and the internal resistance R of the transistor 26, along the discharge curve 37. As seen from the above explanation, in order to render the capacitor 25 effective as the retrace resonance capacitance even during a portion of the later half $D_2$ of the retrace period, it is advantageous that the storage time tsg is selected as long as possible. Thus, for this reason, it will be understood that the arrangement in accordance with the present invention can be constructed with less expense.

Furthermore, with the diode 24 of longer storage time tsg, the capacitor 25 is discharged from the voltage P down to $P_2$, and thence discharged through the discharge circuit comprising $R_1$, and R so that it decreases down to the voltage $P_3$ at the beginning end $t_o'$ of the next retrace period. In the earlier half $t_o'-t_2'$ of the next retrace period the capacitor is charged from the voltage $P_3$ to the voltage P, this making the capacitor more effective as the retrace capacitance. The advantage derived from the longer tsg will be apparent when compared with the discharge curve 36 for the diode of substantially zero storage time.

Since the upper limit of the diode storage time *tsg* is about 2 $\mu$ sec. at most it is impossible to operate the capacitor 25 as the retrace resonance capacitance C′ through the later half period $D_2$ (about 5 $\mu$sec.).

Figure 6:
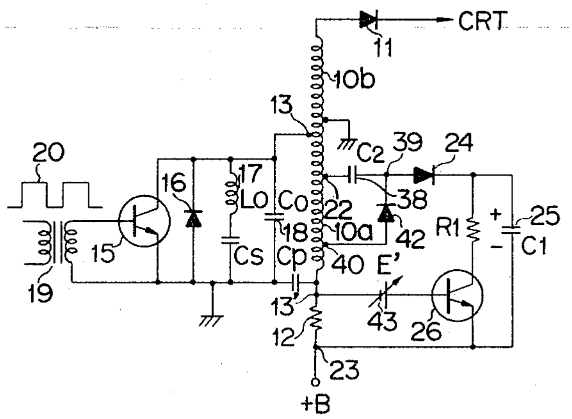
FIG. 6 is a circuit diagram showing another embodiment of the present invention.
Figure 7:
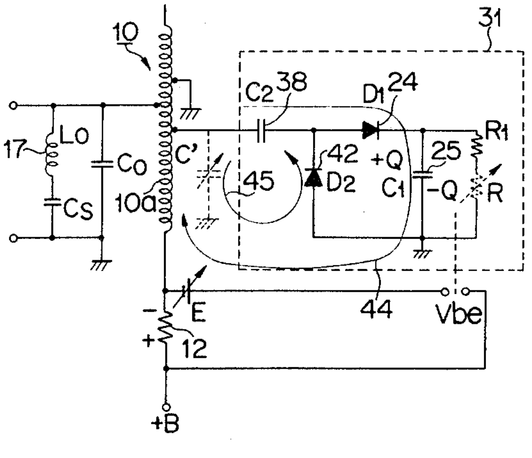
FIG. 7 is an equivalent circuit diagram for the regulator circuit shown in FIG. 6.
Figure 8:
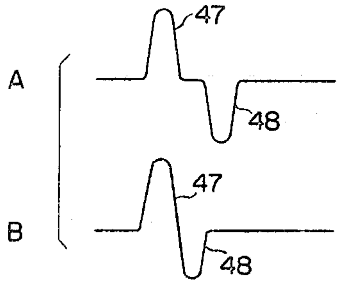
FIG. 8 shows a waveform for illustrating the operation of the circuit of FIG. 6.

Referring to FIG. 6, another embodiment of the present invention is shown wherein the capacitor 25 is rendered to operate as the equivalent retrace resonance capacitance C′ throughout the later half $D_2$ of the retrace period. In FIG. 6 the same reference numbers as those used in FIG. 1 are used to designate similar parts, and only those elements having different constructions or operations than those of FIG. 1 are described here. Connected between the tap 22 and the positive terminal of the first diode 24 is a second capacitor 38 having capacitance $C_2$. Also connected between the junction 39 of the capacitor 38 and the diode 24 and the tap 40 of the primary winding 10*a* is a second diode 42 oriented as illustrated. 43 designates a battery bias voltage supply for the transistor 26 and it is connected between the base and the tap 13′ in the illustrated polarity. The voltage is adjustable to obtain E volts. Alternatively, the bias voltage supply 43 may be constructed by a diode rectifier circuit coupled to the transformer 10 as shown in FIG. 1. FIG. 7 shows an equivalent circuit to illustrate the operation of the embodiment of FIG. 6, and FIG. 8 shows the waveform in somewhat exaggerated fashion.

In this embodiment, as shown in FIG. 7, the flyback pulse serially charges the capacitors 38 and 25 in the direction shown by the arrow 44 through the first diode 24 during the retrace period. Strictly speaking the charging operation occurs during the earlier half $D_1$ of the retrace period as in the circuit of FIG. 1. In this embodiment the charges for both capacitors are identical but the voltage distribution is in inverse proportion to their capacitances. As in the embodiment of FIG. 1, the charge of the capacitor 25 is discharged through the discharge circuit including the transistor 26 (represented by R and $R_1$) during the trace period. As seen from FIG. 3, the smaller the internal resistance R of the transistor becomes, the more is discharged the charge of the capacitor 25 which has been charged by the flyback pulse 33. It is thus apparent that this, in effect, increases the voltage change P—$P_1$ of the capacitor 25 and increases the change of the equivalent capacitor C′ shown in FIG. 7. In this embodiment, however, the capacitor 38 is discharged to the deflection coil Lo through the winding 10*a* in the direction of the arrow 45 during the later half $D_2$ of the retrace period. This means that, as described in connection with FIG. 5, the equivalent capacitance c′ of FIG. 6 is present throughout the later half $D_2$ of the retrace period and functions as the retrace resonance capacitance. Namely, in this embodiment, the series connected capacitors 38 and 25 are charged to equal charge level through the conducting diode 24 during the earlier half $D_1$ of the retrace period to render those capacitors to operate as the retrace resonance capacitance C′ while during the later half period $D_2$ the charge of the capacitor 38 is discharged to the deflection coil Lo through the diode 42 to render the capacitor 38 to operate as the retrace resonance capacitance C′. Thus, the basic principle of regulating the high voltage is same as that of the embodiment of FIG. 1 where it is assumed that the storage time tsg of the diode 24 is equal to the whole period of the later half $D_2$ of the retrace period.

In the circuit of FIG. 6, the charging circuit comprising the second capacitor 38 and the second diode 42 may ground the anode of the second diode 42. However, within one retrace period D the charging current waveform 47 flowing through the first diode 24 and the discharging current waveform 48 flowing through the second diode 42 are separated from each other (see FIG. 8A) and hence full retrace period can not be effectively utilized. Contrary to this, when the anode of the diode 42 is connected to the tap 40 of the transformer 10 and the cathode is connected to the tap 22 through the capacitor 38, the charging current waveform 47 during the earlier half of the retrace period and the discharging current waveform 48 from the capacitor 38 during the later half of the retrace period become continuous (See FIG. 9B) and provide a waveform as if a single capacitor presents. From the experiment it has been found that more efficient high voltage regulation was provided by the embodiment.

Figure 9:
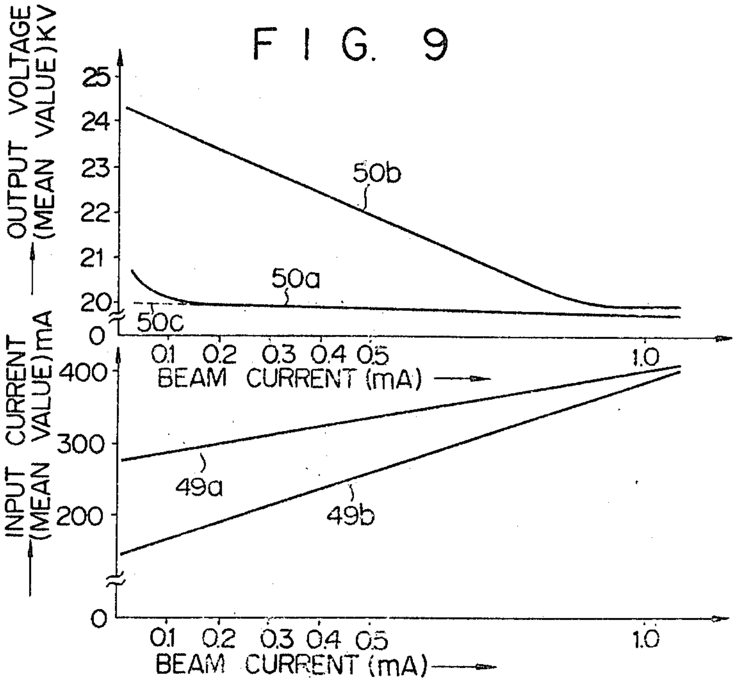
FIG. 9 is a chart showing the relationship between the beam current produced by the circuit of FIG. 1, and the current flowing through the primary winding of the flyback transformer and the output voltage of the high voltage power supply circuit, respectively.

In FIG. 9, the relationship of the beam current actually derived from the circuit of FIG. 1 (X axis in mA) and mean input current through the primary winding 10*a* of the flyback transformer 10 (Y axis in mA) is shown by the line 49*a* and the relationship of the beam current and the output voltage of the high voltage power supply (Y axis in KV) is shown by the line 50*a*. The curves 49*b* and 50*b* represent the characteristics where the high voltage regulator is not used. As seen from the high voltage output characteristic curve 50*a* of FIG. 9, substantially constant high voltage output of about 20 KV is produced for the beam current. In a high voltage regulator of the load power dissipation type as described earlier in this specification, the regulation is effected with the power dissipation (about 25 W) ranging between the curves 50*a* and 50*b*. In such a power dissipation type regulator, the input current characteristic curve flowing through the primary winding 10*a* of the transformer 10 will be maintained substantially constant (at about 400 mA) for the beam current. On the other hand, since the retrace capacitance is controlled for regulating the high voltage in the present invention, the current flowing through the primary winding 10*a* varies between 300 mA and 400 mA for the beam current as shown by the curve 49*a* and hence the power dissipation is less than 10 W. From this aspect it will be understood that the present invention is advantageous. Turning to the high voltage output characteristic curve 50*a* of FIG. 9, it remains almost constant at 20 KV for the beam current of 0.15 mA~0.1 mA but it tends to be above 20 KV for the beam current below 0.15 mA. For preventing this, it has been found that by using VDR (voltage dependent resistor) in place of the current detecting resistor 12 of FIG. 1 the output can be maintained constant at about 20 KV for the beam current below 0.15 mA as shown by the dotted line 50*c*. Namely, when the VDR is used as the current detecting resistor 12, the current sensitivity for the lower range of beam current is favorably improved due to the voltage dependency of the VDR. Since the embodiment using the VDR is constructed by merely inserting a well-known VDR whose resistance value is dependent on voltage in place of the resistor 12 in FIG. 1 or FIG. 6, it is not shown here.

As described hereinabove, the present invention provides a reliable high voltage regulator having many advantages from both its construction and power dissipation.

What we claim is:

1. A high voltage regulation circuit for use in a high voltage power supply circuit for supplying high voltage to a television receiver tube comprising a flyback transformer, a semiconductor horizontal deflection circuit connected to the primary winding of said flyback transformer for supplying flyback pulses to the primary winding and a step-up rectifying circuit for said flyback pulses to supply high voltage to said receiver tube; said regulation circuit including a first diode for rectifying the flyback pulses on the primary winding, a first capacitor connected in substantially parallel with said deflection circuit and charged by the rectified voltage, a semiconductor device connected in parallel with the first capacitor and a control circuit for said semiconductor device for detecting the current flowing through the primary winding during retrace periods and controlling the conductivity of said semiconductor device in response to the detected signal to control the amount of discharge from the first capacitor.

2. The high voltage regulation circuit for use in a television receiver according to claim 1 wherein said semiconductor device is a transistor, and a voltage difference between a voltage drop across the current detecting resistor inserted in the primary winding of the flyback transformer and at least a portion of the rectified and filtered voltage of a fraction of the primary voltage of the flyback transformer is applied to the base of said transistor to control the conductivity of said transistor.

3. The high voltage regulation circuit for use in a television receiver according to claim 1 further including a charge/discharge circuit comprising a second capacitor connected through said first diode and a second diode to said second capacitor in such a polarity that the charge of the second capacitor charged by the flyback pulses is discharged through the primary winding of said flyback transformer during a later half of the flyback pulse period.

4. The high voltage regulation circuit for use in a television receiver according to claim 2 wherein said control circuit includes a VDR (voltage dependent resistor) as a current detecting resistor.

* * * * *